United States Patent [19]
Mori

[11] 3,988,419
[45] Oct. 26, 1976

[54] PROCESS FOR PRODUCING CALCIUM SILICATE INSULATION

[75] Inventor: Ken Mori, Kobe, Japan

[73] Assignee: Kansai Thermal Insulating Industry Company, Limited, Osaka, Japan

[22] Filed: Oct. 22, 1974

[21] Appl. No.: 517,105

[30] Foreign Application Priority Data
May 31, 1974 Japan.............................. 49-60870
May 31, 1974 Japan.............................. 49-60871

[52] U.S. Cl................................. 423/155; 423/331; 106/120
[51] Int. Cl.² ....................................... C01B 33/24
[58] Field of Search .......... 423/331, 155; 106/120; 264/333

[56] References Cited
UNITED STATES PATENTS

| | | | |
|---|---|---|---|
| 2,215,891 | 9/1940 | Thomson et al. ................. | 264/333 X |
| 2,534,303 | 12/1950 | Serinis ............................... | 423/331 |
| 3,100,156 | 8/1963 | Kalousek et al. ................... | 106/120 |
| 3,231,657 | 1/1966 | Kalousek ............................ | 264/333 |
| 3,317,643 | 5/1967 | Denny................................. | 106/120 |
| 3,501,324 | 3/1970 | Kubo et al. ......................... | 106/120 |

*Primary Examiner*—Edward J. Meros
*Attorney, Agent, or Firm*—Wenderoth, Lind & Ponack

[57] ABSTRACT

Calcium silicate insulation consisting mainly of long, mutually entangled, fibrous synthetic xonotlite crystals and having a bulk specific gravity of 0.10 to 0.20 g/cm³ is produced at a very low cost without using any asbestos fibers by stirring very fine scattered ashes consisting mostly of amorphous silica, generated from furnaces where metallic silicon, silicon carbide, ferrosilicon, etc. are produced, with lime raw materials and water with heating, thereby obtaining a gel; kneading the gel under pressure, thereby obtaining a viscoelastic material just before transition to xonotlite crystals; pouring the viscoelastic material in a mold; and treating the viscoelastic material placed in the mold under saturated steam, thereby forming crystals, and successively treating the viscoelastic material under superheated steam, thereby effecting growth and drying of the crystals.

7 Claims, 7 Drawing Figures

PROCESS FOR PRODUCING CALCIUM SILICATE INSULATION

BACKGROUND OF THE INVENTION

This invention relates to a process for producing a calcium silicate insulation, and more particularly to a process for producing a calcium silicate insulation consisting mainly of synthetic xonotlite crystals.

As is well known, synthetic xonotlite crystals are industrially obtained by treating silica raw materials, lime and water under saturated steam at a temperature of 180° to 220° C in an autoclave. At the initial stage of the reaction, quasi-crystalline materials called "C—S—H(1)" are formed, but the quasi-crystalline materials are further converted to tobermorite crystals, if alumina is contained in the raw materials, and their transition to the xonotlite crystals is very difficult to take place. An increase in yield of the xonotlite crystals greatly depends upon the reactivity and grain sizes of silica, and the size and form of the xonotlite crystals also greatly depend upon the kind and grain size of silica.

Heretofore, diatomaceous earth, slag, etc. have been widely utilized as silica raw materials. However, these raw materials contain a large amount of alumina, and have larger grain sizes and a low reactivity with lime. Therefore, it is very difficult to produce calcium silicate containing a large proportion of xonotlite crystals and having a low bulk specific gravity from these silica raw materials.

Synthetic amorphous silica can solve these problems, but is so expensive that the calcium silicate containing synthetic xonotlite crystals cannot be produced at a low cost therefrom.

Furthermore, asbestos fibers are usually mixed into the raw materials to lower the bulk specific gravity and increase the mechanical strength. However, the asbestos fibers have been found in the recent years to give an unfavorable influence upon the health of the handling workers, and it is thus requested not to use the asbestos fibers. However, even if calcium silicate having a bulk specific gravity of 0.10 to 0.20 g/cm$^3$ is attempted to be produced without asbestos fibers, the resulting products develop cracks and cavities therein, are of less strength, and larger products cannot be obtained.

SUMMARY OF THE INVENTION

An object of the present invention is to provide a process for producing a calcium silicate insulation consisting mainly of long, mutually entangled, fibrous xonolite crystals and having a bulk specific gravity of 0.10 to 0.20 g/cm$^3$ without using any asbestos fibers.

Another object of the present invention is to provide a process for producing said calcium silicate insulation at a very low cost and to provide the insulation products resulting from this process.

Other object of the present invention is to provide a process for producing a calcium silicate insulation free from cracks and cavities without using any asbestos fibers.

A further object of the present invention is to provide a process for continuously producing the calcium silicate insulation.

Still further objects of the present invention will be apparent from the disclosure which follows.

The present process for producing a calcium silicate insulation comprises preparing scattered ashes consisting mainly of very fine amorphous silica, which evaporate off from furnaces used for producing metallic silicon, silicon carbide, ferrosilicon, etc.; heating and stirring the scattered ashes together with lime and water, thereby obtaining a gel resulting from uniform reaction of said materials; kneading the gel under pressure, thereby obtaining a viscoelastic material just before transition into xonotlite; pouring the viscoelastic material into a mold; treating the viscoelastic material placed in the mold under a saturated steam, thereby forming crystals; and successively treating the material under superheated steam, thereby growing the crystals and drying and hardening the material.

It is one of the characteristics of the present process to use scattered ashes as the silica raw material.

In the production of metallic silicon, silicon carbide, ferrosilicon, etc., crystalline silica ($SiO_2$) of high purity and carbon (cokes, etc.) are used as raw materials, mixed and melted in an electric furnace. At that time, the furnace inside temperature reaches 2,000° C or more, and therefore the silica is reduced to silicon, and evaporated. The evaporated silicon reacts with oxygen in the air to form very fine amorphous silica, which will be hereinafter referred to as "scattered ashes", and is scattered away. The scattered ashes must be collected in a dust collector, because the scattered ashes will be a cause of dust air pollution if they are not recovered. If the collected ashes are thrown away as such, they will be another cause for environmental pollution. That is, the treatment of the scattered ashes is very troublesome, and thus the collected scattered ashes have been so far utilized merely in the reclamation of the foreshore. However, even in the reclamation, the scattered ashes are so fine that they cannot be utilized so much. Thus, the treatment and use of the scattered ashes is a serious problem.

It is one of the characteristics of the present process to effectively utilize the troublesome scattered ashes, whose mere discarding is a cause for environmental pollution, as described above, to obtain calcium silicate-shaped materials having distinctive properties.

The scattered ashes used in the present process consist of 85 to 95% by weight of amorphous silica, and 15 to 5% by weight of metallic oxides and carbon, and have a mean grain size of 0.1 micron. Since the scattered ashes used in the present process are ultra-fine particles, they have a good reactivity with lime, and can be formed in a gel by treatment for a short time. They take up much water during the reaction and are brought into a much swollen state.

Further, in the present invention, a hydrogen gas is generated during the reaction with lime owing to the presence of a small amount of metal in the scattered ashes, and numerous pores having sizes of 5 to 10 microns are formed in the shape materials. The formation of the pores effectively makes the shaped materials lighter and at the same time increases the heat insulation.

In the present invention, the scattered ashes are ultra-fine particles and have a high silica content and a good reactivity with lime, as described above, and thus the xonotlite crystals are very easily and assuredly formed by heat treatment of the scattered ashes under pressure with steam in an autoclave, and the resulting fibrous crystals are longer and more complicatedly entangled with one another than the conventional xonotlite, and the mechanical strength and endurance in a high temperature use are considerably increased thereby. Further, the xonotlite of strength can be easily formed, which, in addition to the effects of the present process as described above, makes it unnecessary to use asbestos fibers.

The silica raw material used in the present invention contains only a very small amount of impurities capable of promoting the formation tobermorite, for example, metallic oxides such as $Al_2O_3$, and therefore almost all of the hydrated calcium silicate in the product is in a xonotlite former, which can considerably increase the heat resistance (service limit temperature) up to 1,000° – 1,050° C.

According to the present invention, such scattered ashes are heated and stirred together with the lime raw materials such as quick lime, slaked lime, etc. and water. The stirring is carried out by the well known rotating stirrer. During the stirring, the heating temperature is kept at not more than 100° C, preferably 90° to 98° C. Of course, the stirring can be carried out using water heated in advance, or using hot water while heating. The scattered ashes are very fine and very reactive with the lime, and as a result of the stirring, a gel having a molecular ratio of $CaO/SiO_2$ of 1:1, which has been sufficiently swollen and has been uniformly reacted, can be obtained. In the initial mixture, about 10 to 20 parts by weight of water are employed per 1 part by weight of silica and 0.8 to 1.5 parts by weight of lime.

The resulting gel is then kneaded under saturated steam, that is, stirred uniformly and gently on the whole without breaking the gel. Such kneading is preferably carried out by the use of an apparatus comprising a rotatable pressure vessel having a plurality of narrow, elongated plates arranged radially inside this vessel. When the gel is completely kneaded in such kneading step, the gel turns to a viscoelastic material just before transition to xonotlite crystals. This is to say, the resulting viscoelastic material contains a large amount of quasi-crystalline substances called "C—S—H(1)" and has a moleclar ratio of $CaO/SiO_2$ of 1:1 throughout, that is, even to very fine portions. The viscoelastic material is found in a fibrous state by electron microscopic observation, and also defined as gel by X-ray diffraction. By the term "viscoelastic material", it is meant that the material at this stage is very viscous but is sufficiently elastic to be worked in the kneading and molding steps. The kneading is carried out under saturated steam at 1 to 18 kg/cm², which is applicable to the case where a mixing ratio of the raw materials is constant. In other cases, it is noteworthy that the water content of the gel can be adjusted by using superheated steam in place of the saturated steam. By such kneading under pressure, the crystallization of the viscoelastic material starts both inside and outside of the gel at the same time, and successive formation and growth of the crystals are continued both inside and outside of the gel at the same time.

The viscoelastic material is then poured into a mold of the desired shape. The molding can be carried out by various procedures, for example, pouring, pressure molding, etc. It is preferable to carry out this step in an autoclave, because the treatment in the autoclave can be facilitated and the temperature change of the viscoelastic material can be reduced thereby. The viscoelastic material placed in the mold is treated under saturated steam in the autoclave. The treatment is carried out for 1 to 48 hours, using the saturated steam at a pressure of 12 to 50 kg/cm². As a result, the crystalline substance C—S—H(1) of the viscoelastic material starts to undergo transition to needle-like crystal of xonotlite. The remaining gel starts to undergo transition to C—S—H(1). By elevating the temperature of the autoclave, or reducing the pressure of the autocalve, or effecting the temperature elevation and pressure reduction at the same time successively, the inside of the autoclave is made full of superheated steam, and the crystalline substances are treated under the superheated steam. Preferably, the steam within the autoclave is passed through a superheater to effect superheating, and is subjected to pressure reduction at the same time, whereby superheated steam having a degree of superheating of 5° to 150° C is obtained. The crystalline substances are treated under said superheated steam for 3 to 30 hours, and then the autoclave is subjected to slow pressure reduction and temperature lowering, so that the final pressure and the finaal temperature may reach atmospheric pressure and a temperature of 100° to 150° C, respectively. Through such treatment under superheated steam, the needle-like crystals of xonotlite are developed to complete xonotlite crystals, and at the same time water is removed from the crystals, whereby the distances between the crystal particles are shortened, and the crystals are dried and hardened.

The present process is characterized by using the scattered ashes as the silica raw material, kneading the gel under pressure and treating viscoelastic material in an autoclave, and can produce calcium silicate insulation consisting of long, mutually entangled, fibrous xonotlite crystals and having a large size and a very low bulk specific gravity without using any asbestos fibers. According to the tests conducted by the present inventor, it was difficult to obtain such calcium silicate insulation without these three characteristics.

COMPARISON WITH PRIOR ART

Heretofore, calcium silicate has been widely produced by stirring silica raw material with lime and water with heating, dehydrating and molding the resulting mixture of gel, treating the molded articles in an autoclave under saturated steam, and drying the treated articles. However, the prior art has not been aware of the advantages to be realized from kneading of the gel under pressure and autoclave treatment under the saturated steam and superheated steam of the present process. It was found in the tests conducted by the present inventor that, even if the scatterred ashes were used as the silica raw material and mixed with asbestos fibers, it was very difficult to obtain any calcium silicate insulation having a large size, because almost all of the insulation products had cracks when the insulations having a bulk specific gravity of not more than 0.15 were prepared, and further that all of the insulations had cracks without asbestos fibers.

Japanese patent publication specification No. 25771/70 and the corresponding French patent specification No. 1,534,997 disclose another process for producing calcium silicate by stirring silica raw materials with lime and water under saturated steam, thereby obtaining a slurry, molding the slurry and then drying the molding. On the other hand, the present process comprises stirring the raw materials with heating, kneading the resulting gel under pressure, then molding the resulting viscoelastic material, and treating the molding under saturated steam and superheated steam, and is distinguished in process steps from said well known process. The slurry obtained in these prior Patents is quite different from the gel and viscoelastic material of the present invention, and consists of xonotlite crystals. In the tests using the scattered ashes as the silica raw materials, the calcium silicate having a bulk specific gravity of $0.18 g/cm^3$ or less has cracks, when prepared according to the prior art process.

U.S. patent specification No. 2,534,303 discloses a process for producing calcium silicate by molding silica raw material, water, lime and asbestos fibers by pouring, and treating the molding in an autoclave under saturated steam and superheated steam. However, the prior art process is not provided with the step of kneading a gel under pressure or even with a step of stirring the raw materials with heating as proposed in the present invention. It was found in the test conducted by the present inventor according to the prior art processes that any calcium silicate having a bulk density of $0.18 g/cm^3$ or less was not obtained owing to considerable shrinkage. Other known prior art which relates to this subject matter are U.S. Pat. Nos. 2,716,070, 2,748,008, 2,766,131, 2,944,911, 3,317,643, 3,227,570 and 3,501,324.

None of the prior art processes of which the present inventor is aware discloses the use of scattered ashes generated from furnaces where metallic silicon, silicon carbide, ferrosilicon, etc. are produced, as the silica raw materials.

DETAILED EXPLANATION OF THE INVENTION

The present process comprises stirring scattered ashes generated from furnaces where metallic silicon, silicon carbide, ferrosilicon, etc. are produced, together with lime and water with heating, kneading the resulting gel under pressure, molding the resulting viscoelastic material just before transition to xonotlite crystals, and treating the molding in an autoclave under saturated steam and successively under superheated steam.

Figure 1:
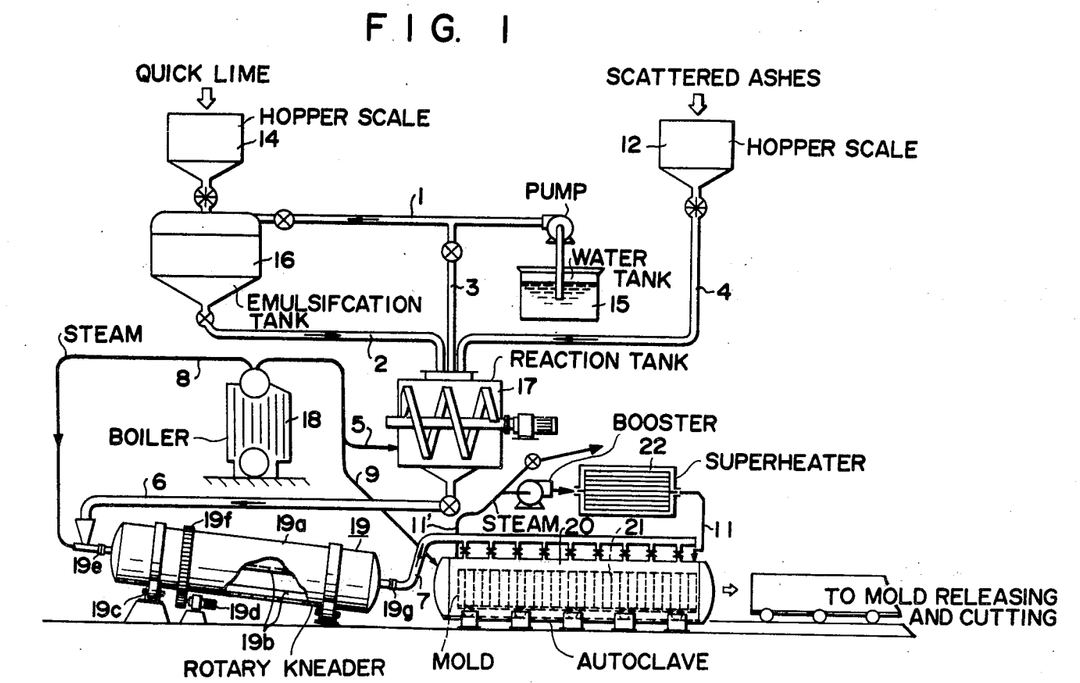
FIG. 1 is a schematic flow sheet showing a preferable embodiment of the present process for producing calcium silicate insulation.

In FIG. 1, a preferred embodiment of the present process is illustrated. Scattered ashes are led to storage in a hopper scale 12 by means of a conveyer or the like, and lime is likewise stored in a hopper scale 14 by means of a conveyer of or the like. Water is heated to a temperature of 50° to 70° C in advance in a tank 15. As the lime, quick lime is used, and weighed at the desired mixing ratio, and charged into stirred emulsification tank 16. Water is also charged or pumped into the emulsification tank 16 from the tank 15 by line 1 and stirred. The resulting slaked lime slurry reaches a temperature of 90° to 100° C in tank 16 with conversion of guide lime to the slaked lime. The slaked lime slurry is led by line 2 to a reaction tank 17, and uniformly stirred therein with hot water via line 3 from the tank 15 and the scattered ashes from hopper scale 12 via line 4. Steam is introduced into the reaction tank from a boiler 18 by line 5, and the stirring is carried out while keeping the temperature at 90° to 100° C thereby. The resulting gel is led to a rotary kneader 19 by line 6.

The rotary kneader comprises a cylindrical, tightly sealed vessel 19a which is vertically obliquely arranged and rotatably supported on turning rollers 19c so as to be rotated by an electric motor 19d via a set of gears 19f. A plural number of stirring blades 19b are arranged inside the vessel 19a. Each blade 19b is made with a narrow, elongated plate which is positioned radially on the inner surface of the vessel in such a way that its longitudinal length extends between the opposite end plates of this vessel. A pipe 6 for supplying gel from the reaction tank 17 to vessel 19a is connected to an end plate of the vessel 19a through a swivel joint 19e. An outlet pipe 7 is connected at one extremity to the other end plate of the vessel 19a and at the other extremity to an autoclave 20. The gel is kneaded uniformly and gently on the whole, and discharged from the other end of the vessel by pipe 7. The gel is kneaded in the rotary kneader under a pressure of steam introduced from the boiler 18 by line 8 and turned into a viscoelastic material just before transition to xonotlite crystals. The viscoelastic materal is then led to an autoclave 20, and poured into a mold 21 placed within the autoclave.

When the pouring into the mold is completed, saturated steam is supplied by line 9 to the autoclave from the boiler 18. The viscoelastic material undergoes formation of xonotlite crystals under the saturated steam. Then, the steam within the autoclave is heated by a superheater 22 via lines 11 and 11' and at the same time, the autoclave is subjected to pressure reduction, whereby the inside of the autoclave is brought into a state under superheated steam. In this step, complete crystallization and growth of the xonotlite crystals are carried out, and at the same time dried. After the pressure and temperature of the autoclave are reduced to an atmospheric pressure and 100° to 150° C, respectively, the molded material is withdrawn from the autoclave as a product.

The present invention will now be explained by way of Examples on the basis of the foregoing steps. The scattered ashes used in the following Examples are those generated from the furnace where metallic silicon or ferrosilicon is produced and caught by a dust collector, and have the following composition.

(1) Grain size

| More than $5.5\mu$ | 1.5% |
| $5.5 \sim 1.0\mu$ | 6.0% |
| Less than $1.0\mu$ | 92.5% |

Electron microscope observation reveals that most of the particles of less than $1.0\mu$ has a size of about $0.1\mu$.

(2) Chemical composition

| Ignition loss | 3.30% |
| Insoluble residues | 2.82% |
| Soluble $SiO_2$ | 91.34% |
| $Fe_2O_3$ | 0.38% |
| $Al_2O_3$ | 0.61% |
| CaO | 0.33% |
| MgO | 0.31% |
| TOTAL | 99.09% |

Note: Analytical procedure is in accordance with that described in Shoichiro Nagai: Handbook of Silicate Industry, Test of volcanic ashes, diatomaceous earth, etc.

The following Examples are presented to illustrate the invention. In these examples and throughout this specification, parts are by weight unless otherwise indicated.

EXAMPLE 1

Figure 2:
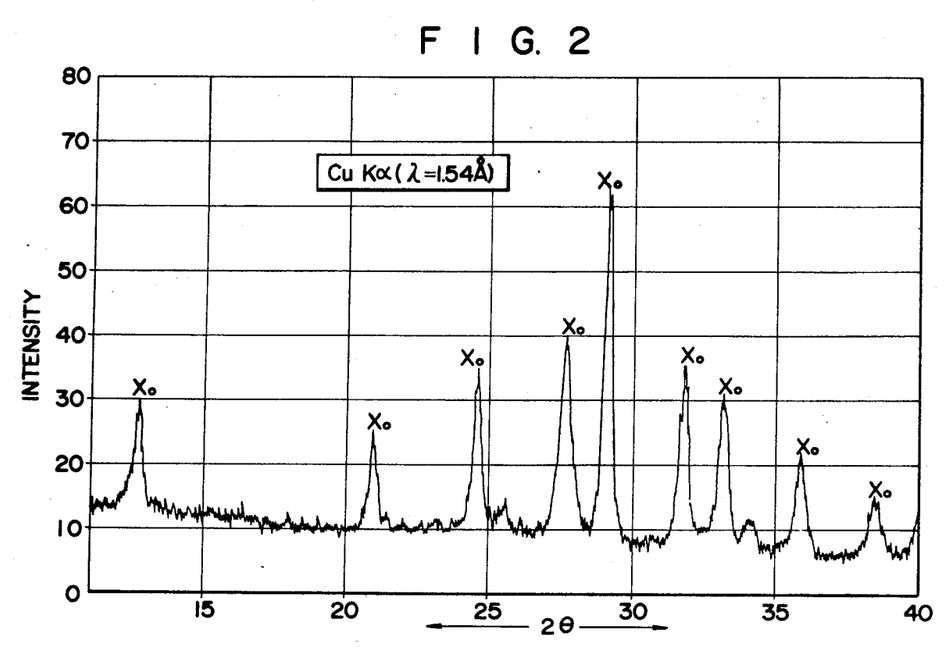
FIGS. 2 – 7 are X-ray diffraction diagrams of calcium silicate products of this invention obtained according to Examples 1 – 6.

Ten parts by weight of scattered ashes, 12 parts by weight of slaked lime and 160 parts of weight of water are stirred in a reaction tank at a temperature of 90° C for 70 minutes, and the resulting gel is placed in a rotary kneader, and kneaded while elevating the inside of the kneader to a pressure of 7 kg/cm$^2$ with saturated steam over a period of 1 hour. The resulting viscoelastic material is poured into a mold in an autoclave, land then the inside of the autoclave is kept at a saturated steam pressure of 20 kg/cm$^2$ for 2 hours. Then, the autoclave is successively heated to a temperature of 240° C, kept at that temperature for 3 hours, and then cooled to a temperature of 100° C over a period of 3 hours, and at the same time depressurized to an atmospheric pressure over a period of 6 hours, whereby the viscoelastic material is subjected to superheated steam treatment. The resulting calcium silicate has a bulk specific gravity of 0.11 g/cm$^3$ and a bending strength 0f 4.7 kg/cm$^2$, and consists of complete xonotlite crystals, as is obvious from the X-ray diffraction diagram of FIG. 2.

EXAMPLE 2

Figure 3:
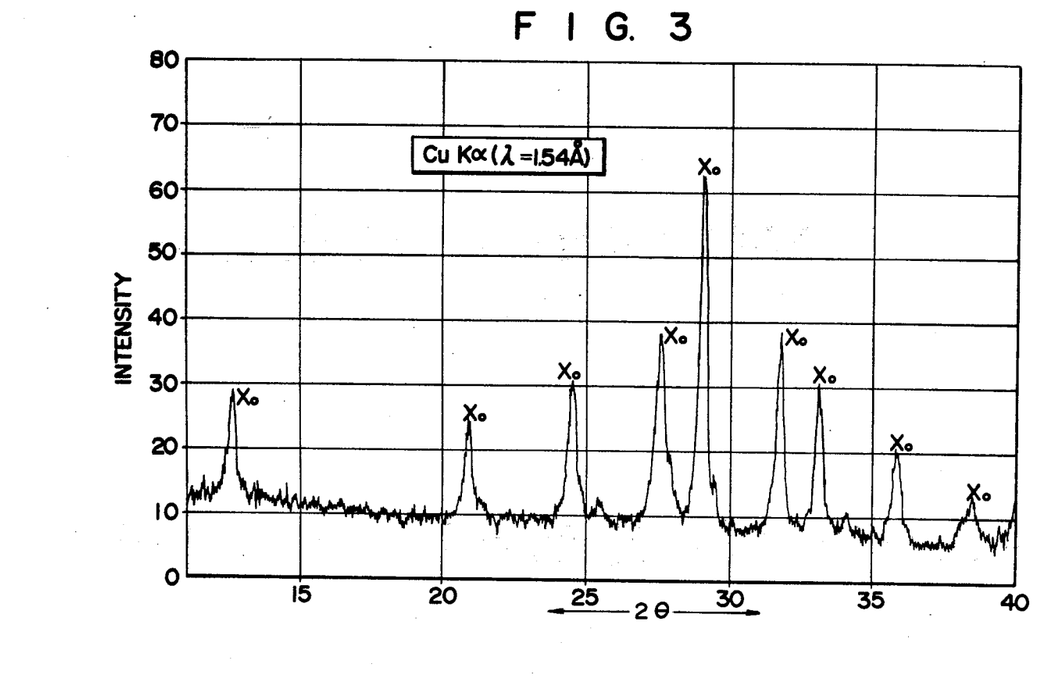

Ten parts by weight of scattered ashes, 12 parts by weight of slaked lime, and 124 parts by weight of water are stirred and kneaded in the same manner as in Example 1, and the resulting viscoelastic material is poured into a mold in an autoclave. Then, the inside of the autoclave is kept at a standard steam pressure of 20 kg/cm$^2$ 3 hours, and successively the steam of the autoclave is heated to a temperature of 240° C, and the autoclave is kept at a temperature for 3 hours. Then, the autoclave is cooled to a temperature of 100° C over a period of 3 hours, and at the same time as the heating, the autoclave is depressurized to an atmospheric pressure over a period of 6 hours. The resulting calcium silicate has a bulk specific gravity of 0.13 g/cm$^3$ and a bending strength of 5.0 kg/cm$^2$; and consists of complete xonotlite crystals as shown in the X-ray diffraction diagram of FIG. 3.

EXAMPLE 3

Figure 4:
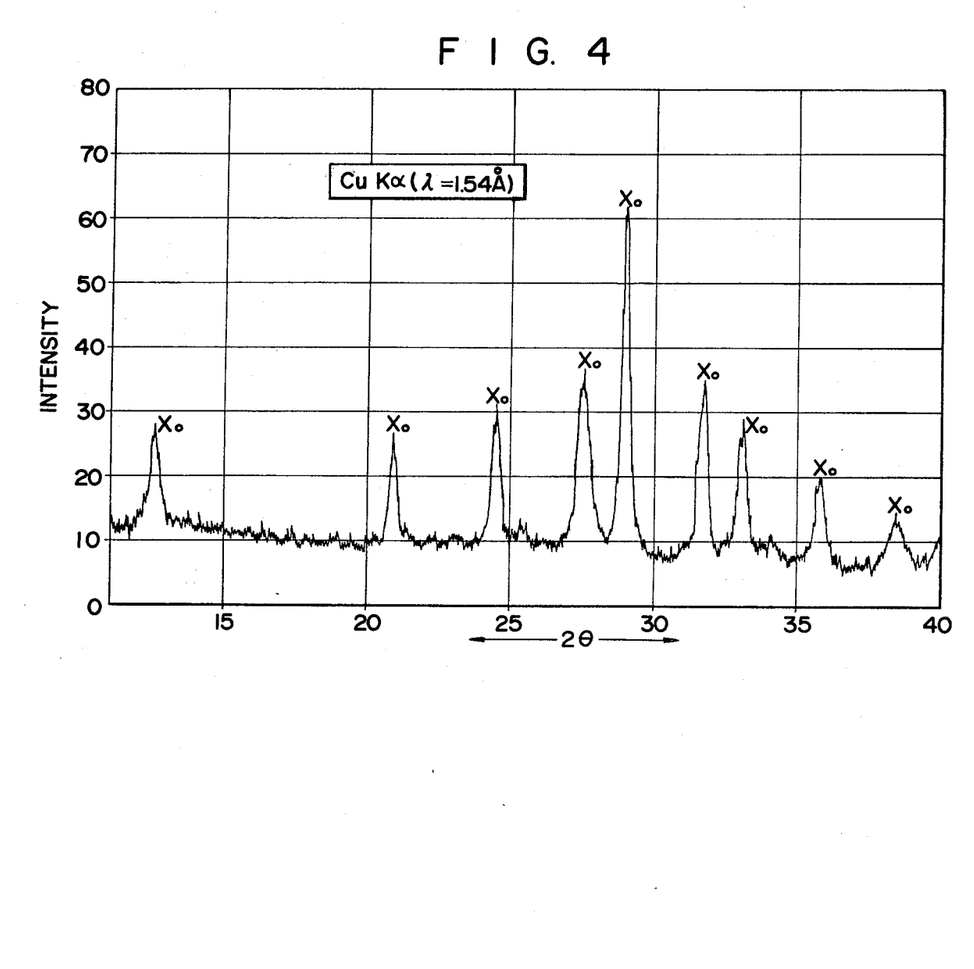

Ten parts by weight of scattered ashes, 12 parts by weight of slacked lime, and 170 parts by weight of water are stirred at a temperature of 90° C for 120 minutes, thereby obtaining a gel. The resulting gel is placed in a rotary kneader, and kneaded, while elevating the inside of the kneader to a saturated steam pressure of 8 kg/cm$^2$ over a period ob 1.5 hours. The resulting viscoelastic material is poured into a mold in an autoclave, and the autoclave is kept at a saturated steam pressure of 20 kg/cm$^2$ for 3 hours. Then, the autoclave is successively heated to 240° C, and kept at that temperature for 2.5 hours, and at the same time the autoclave is depressurized to a pressure of 12 kg/cm$^2$ over a period of 2.5 hours. Then, the autoclave is cooled at 100° C and depressurized to an atmospheric pressure over a period of 2 hours. The resulting calcium silicate has a bulk specific gravity of 0.10 g/cm$^3$, and a bending strength of 4.1 kg/cm$^2$, and consists of complete xonotlite crystals, as shown in the X-ray diffraction diagram of FIG. 4.

EXAMPLE 4

Figure 5:
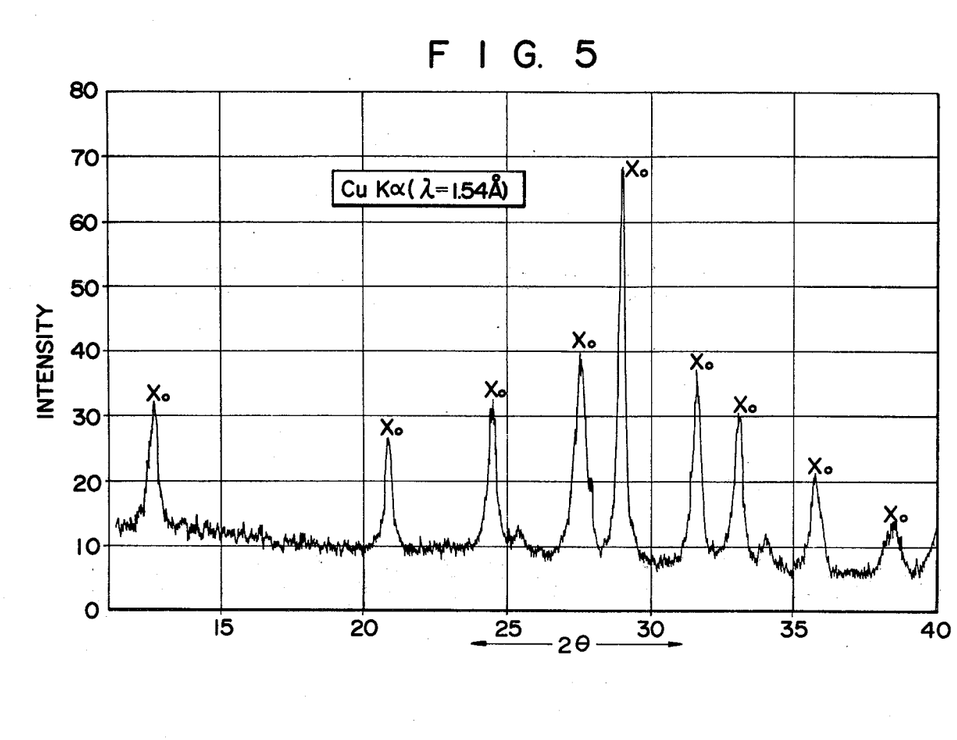

Ten parts by weight of scattered ashes, 12 parts by weight of slaked lime, and 124 parts by weight of water are stirred at 90° C for 70 minutes. The resulting gel is kneaded in a rotary kneader, while elevating the inside of the rotary kneader to a saturated steam pressure of 9 kg/cm$^2$. The resulting viscoelastic material is poured into a mold in an autoclave, and treated in the autoclave under a saturated steam pressure of 27 kg/cm$^2$ for 2.5 hours. Then, the steam of the autoclave is successively superheated to 270° C, and the viscoelastic material is treated at that temperature for 3.5 hours, and then the autoclave is cooled to 110° C over a period of 1 hour, and at the same time the autoclave is depressurized to an atmospheric pressure over a period of 4.5 hours, whereby the viscoelastic material is subjected to superheated steam treatment. The resulting calcium silicate has a bulk density of 0.13 g/cm$^3$ and a bending strength of 5.8 kg/cm$^2$, and consists of complete xonotlite crystals, as shown in the X-ray diffraction diagram of FIG. 5.

EXAMPLE 5

Figure 6:
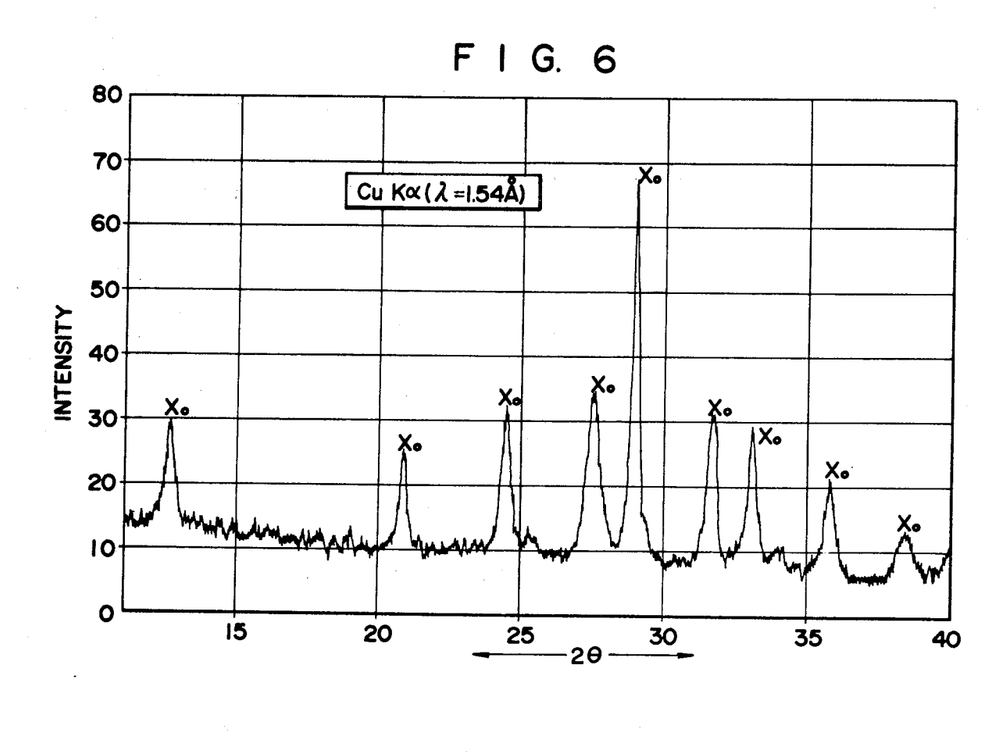

Ten parts by weight of scattered ashes, 12 parts by weight of slaked lime, and 124 parts by weight of water are stirred at 90° C for 70 minutes. The resulting gel is placed in a rotary kneader, and kneaded, while elevating the inside of the kneader to a saturated steam pressure of 9 kg/cm$^2$ over a period of 0.5 hours. The resulting viscoelastic material is poured in a mold in an autoclave, and treated under a saturated steam pressure of 20 kg/cm$^2$ for 1 hour. Then, the steam of the autoclave is successively superheated to 240° C, and the autoclave is kept at that temperature for 4 hours, and then cooled to 150° C over a period of 4.5 hours. The resulting clacium silicate has a bulk specific gravity of 0.13 g/cm$^3$ and a bending strength of 5.4 kg/cm$^2$, and consists of complete xonotlite crystals, as shown in the X-ray diffraction diagram of FIG. 6.

EXAMPLE 6

Figure 7:
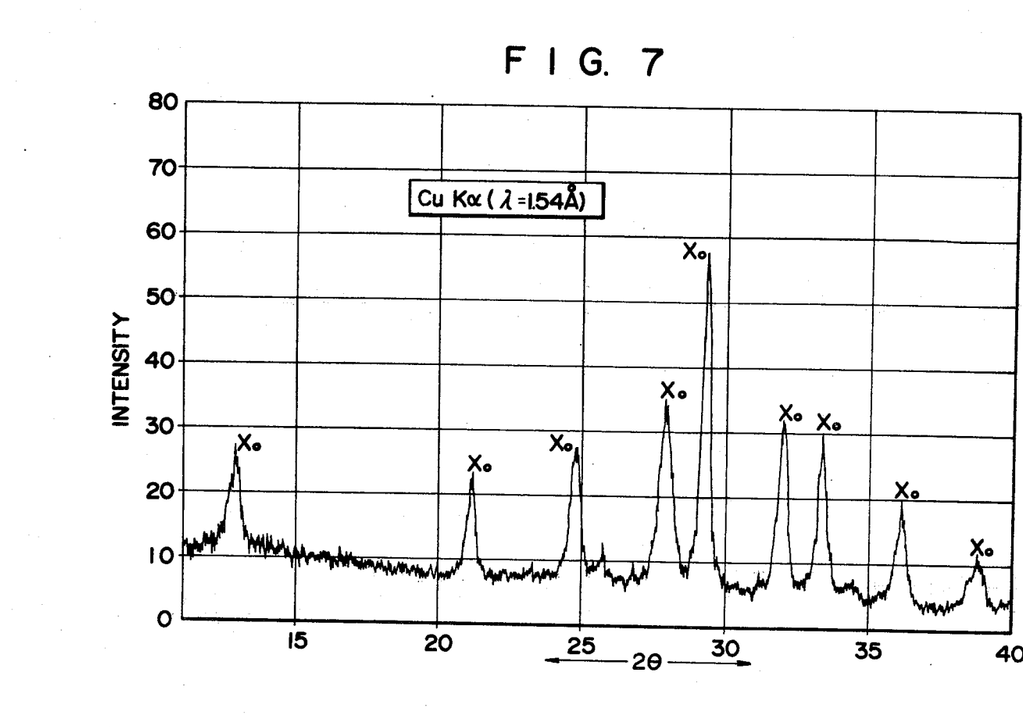

Ten parts by weight of scattered ashes, 9 parts by weight of quick lime and 160 parts by weight of water are stirred at a temperature of 90° C, and the resulting gel is kneaded in a rotary keader, while elevating the inside of the kneader to a saturated steam pressure of 8 kg/cm$^2$. The resulting viscoelastic material is poured in a mold in an autoclave, and then treated therein under a saturated steam pressure oof 20 kg/cm$^2$, while keeping the autoclave under the pressure for 3 hours. Then, the autoclave is successively heated to a temperature of 240° C, and kept at that temperature for 7 hours, and then cooled to 110° C over a period of 1 hour, and at the same time depressurized to an atmospheric pressure over a period of 8 hours, whereby the viscoelastic material is subjected to superheated steam treatment. The resulting calcium silicate has a bulk specific gravity of 0.11 g/cm$^3$ and a bending strength of 4.6 kg/cm$^2$, and consists of complete xonotlite crystals, as is obvious from the X-ray diffraction diagram of FIG. 7.

The invention has been described herein with reference to certain preferred embodiments. However, as obvious variations thereon will become apparent to those skilled in the art, the invention is not to be considered as limited thereto.

What is claimed is:

1. A process for producing calcium silicate insulation consisting of synthetic xonotlite crystals and having a bulk specific gravity of 0.10 to 0.20 g/cm$^3$, entirely free from asbestos fibers, which comprises:
   a. preparing a mixture of (1) very finely scattered ashes composed principally of finely divided amorphous silica; (2) lime raw materials; and (3) water;
   b. stirring and heating the scattered ashes with the lime raw materials and water to thereby obtain a gel;
   c. kneading the gel gently, without breaking the gel, under saturated steam pressure to convert the gel to a viscoelastic material just prior to transition into xonotlite crystals;
   d. pouring the viscoelastic material in a mold; and
   e. treating the viscoelastic material in the mold with saturated steam, thereby forming crystals, and then treating the viscoelastic material under super-heated steam, thereby effecting growth and drying of the crystals.

2. A process according to claim 1 wherein the water is hot water heated in advance; the lime raw material is a slaked lime slurry resulting from stirring of slaked lime and water; the stirring of the scattered ashes with heating is carried out together with the hot water and the slaked lime slurry; the kneading is carried out under saturated steam while increasing the steam pressure gradually and the molding is carried out under saturated steam.

3. A process according to claim 1, wherein the kneading is carried out under superheated steam, thereby adjusting the water content of the resulting viscoelastic material.

4. A process according to claim 1, wherein about 1 part of amorphous silica is reacted with about 10 to 20 parts of water and about 0.8 to 1.5 parts of lime raw materials.

5. A process according to claim 1 wherein the superheated steam is produced by further heating the saturated steam employed in the treatment of the viscoelastic material in the mold with saturated steam, while at the same time lowering the pressure of said saturated steam.

6. A process according to claim 1, wherein the various steps are carried out as follows:
   a. the mixture is prepared from (1) 1 part by weight of the very finely scattered ashes, (2) 0.8 to 1.5 parts by weight of lime raw materials and (3) 10 to 20 parts by weight of water, said scattered ashes consisting of 85 to 95% by weight of amorphous silica and 15 to 5% by weight of metallic oxides and carbon and have a mean grain size of 0.1 microns;
   b. the stirring of the mixture is carried out at a temperature not more than 100° C;
   c. the gel is kneaded under a saturated steam pressure of 1 to 18 kg/cm$^2$;
   d. the viscoelastic material is poured into a mold in an autoclave; and
   e. the viscoelastic material is treated in the mold over a saturated steam pressure of 12 to 50 kg/cm$^2$ for 1 to 48 hours to form crystals and then is subjected to super-heated steam produced by further heating the saturated steam to effect growth and drying of the crystals.

7. A process according to claim 6 wherein the water in the mixture of step (a) is hot water heated in advance and the lime raw material is quick lime; and wherein the water and quick lime are mixed to form a slurry of slaked lime, which slurry is subsequently mixed with the scattered ashes and stirred together to form a gel.

* * * * *